March 28, 1944.     J. F. COYLE     2,345,241
POTATO DIGGER
Filed Aug. 25, 1943
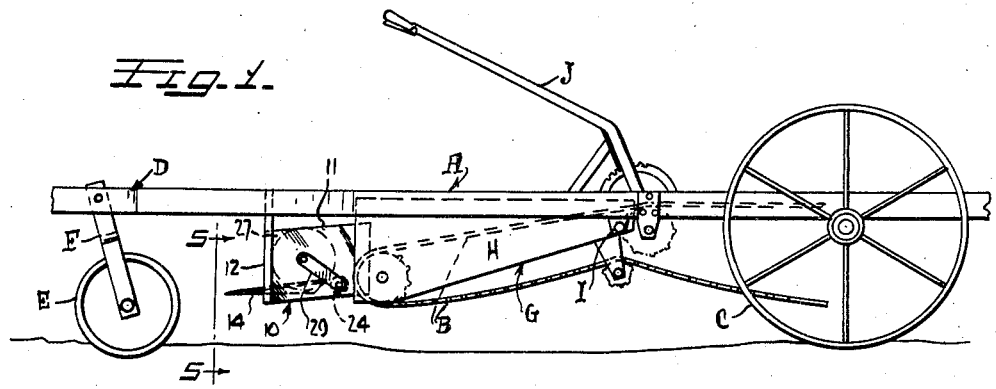
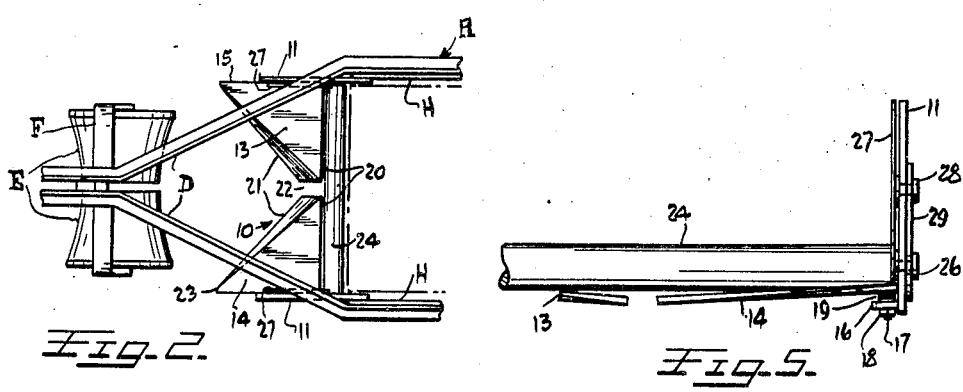
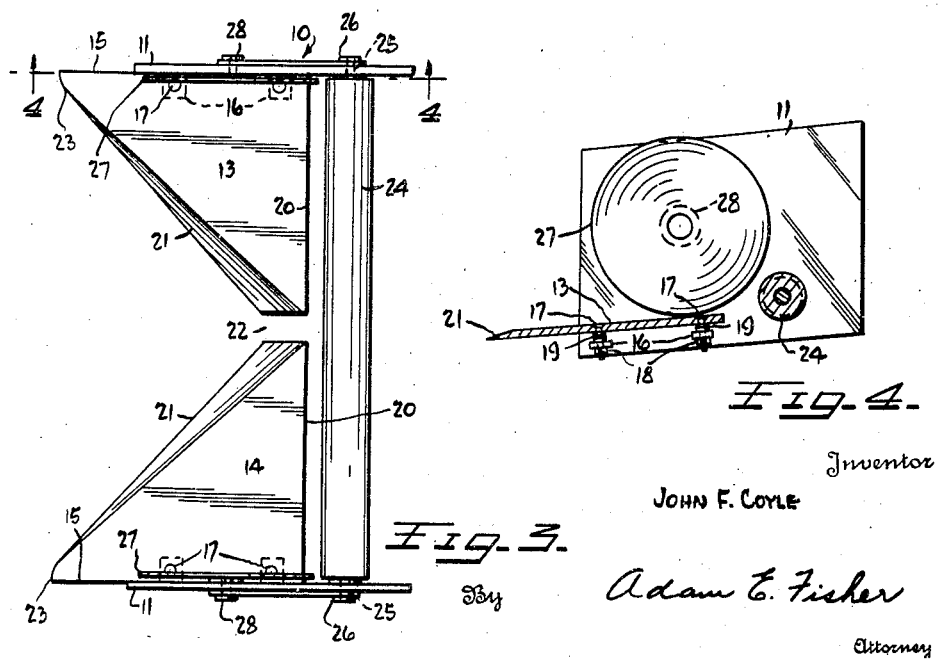
Inventor
JOHN F. COYLE
By Adam E. Fisher
Attorney Patented Mar. 28, 1944

2,345,241

UNITED STATES PATENT OFFICE 2,345,241

POTATO DIGGER

John F. Coyle, Mitchell, Nebr.

Application August 25, 1943, Serial No. 499,940

2 Claims. (Cl. 55—51)

This invention relates to improvements in potato diggers.

The primary object of my invention is to improve the digging or harvesting elements of such implements. I therefore provide, as an attachment for any conventional type of implement and as a replacement for certain parts thereof, a frame assembly which includes side plates designed to keep the potato vines from falling off to the sides, a pair of blades or shovels of novel shape and arrangement which facilitates their operation in pulling the vines, a roller which guides the vines onto the screening elements of the implement, and finally a pair of side disks which act to prevent the accumulation of dirt and trash at the junctions of the blades and side plates.

Another object is to provide digging apparatus of this character wherein the blades or shovels are mounted for convenient adjustment and replacement when required, and in which the blades are arranged to scour or polish so that they will stay clean and will properly perform their functions.

Another object of my invention is to provide an attachment or apparatus of the foregoing nature which is simple, inexpensive and durable in construction and which may be readily applied to the implement.

With these and other ancillary objects in view, the invention resides in the novel construction and arrangement of parts as hereinafter fully set forth and claimed, reference being had to the accompanying drawing, wherein Figure 1 is a side elevation showing a part of a conventional form of potato digging implement and showing my invention applied thereto, the parts being shown in the elevated, or transport positions.

Figure 2 is a fragmentary plan view of a forward portion of the structure as shown in Figure 1.

Figure 3 is an enlarged plan view of the attachment forming my invention, detached from the implement.

Figure 4 is a vertical, longitudinal section taken along the line 4—4 in Figure 3.

Figure 5 is a fragmentary frontal elevation, showing one side of the attachment, this view being taken substantially along the line 5—5 in Figure 1 but showing no part of the implement itself.

Referring now more particularly and by reference characters to the drawing, A designates the frame of a conventional type of potato digger which is designed to be drawn by a tractor (not shown) or other draft means along the potato row and which harvests the potatoes, digging and pulling the vines from the rows, passing them onto a bar screen and conveyor mechanism B whereon the dirt and trash is shaken free and dropped back to the ground, and finally delivering the cleaned vines to windrows on the field for picking and sacking. The frame is rearwardly supported by ground wheels C and at its forwardly converging end D is supported by the vine rollers E which roll down the vines. The rollers are carried in a fork F which swings back as the machine moves forwardly. The draft connection (not shown) is, of course, made to the forward end D of the machine.

Forming a part of the frame A is a subframe G which comprises spaced and parallel sides H pivoted at rear ends at I to the frame A. These sides may swing in vertical planes with respect to the frame A to raise and lower their forward ends, such adjustment being carried out by means of a hand lever J connected to the sides H in conventional manner. In the usual implement the digging shovels are carried at forward ends of the sides H and the vertical adjustment of these sides thus will regulate the working depth of the shovels.

My invention comprises the digging elements or mechanism designated generally at 10 in the drawing, and which is designed and adapted to be applied to the implement, replacing the usual digging apparatus and shovels thereof. The attachment 10 comprises a frame structure made up of a pair of transversely spaced, parallel side plates or members 11 which are secured in any suitable manner, as by welding or by bolts, to the forward ends of the sides H of the subframe G and which extend forwardly therefrom as clearly shown in Figures 1 and 2. Upright guide bars 12 may be depended, if desired, and as shown in Figure 1, from the frame A to slidably engage outer sides of the side plates 11 at their forward ends to provide against lateral displacement of the plates as they are moved up and down along with the subframe G. All other parts of my invention are supported from the side plates 11.

My improved digging blades or shovels 13 and 14 are secured one to each side plate 11, these blades having straight outer edges 15 which meet the inner sides of the plates and which are supported upon apertured mounting lugs 16 welded or otherwise secured to the plates in pairs as shown. Bolts 17 are passed downwardly through the margins of the blades 13 and 14 and through the lugs 16 so that by turning up the nuts 18 on the lower ends of the bolts the blades may be rigidly secured in place. Any number of washers 19 may be interposed between the blades and the lugs to adjust the blades vertically with respect to the side plates 11 and to adjust the slope of the blades. The blades 13 and 14 are substantially triangular in shape, having in addition to the outer edges 15 the straight rear edges 20 disposed at right angles to the side plates 11, and the rearwardly and inwardly angled cutting edges 21 which are sharpened or beveled from near the outer forward corners of the blades to their inner ends as clearly shown. The width of the blades is such that, when thus mounted, a narrow space 22 is provided between their inner ends. The said outer corners of the blades are rounded off slightly as shown at 23.

The blades 13 and 14 are preferably arranged to slope in an inward direction, as seen in Figure 5, which slope, together with the rearwardly converging cutting edges 21, serves to guide the vines inwardly as the blades dig and lift the vines from the rows. In addition this action greatly facilitates the proper polishing or scouring of the blades keeping them clean and in best condition at all times. Such slope of the blades may be varied by adjusting the number of the washers 19 used at each of the mounting bolts 17 and by the angularity of the mounting lugs 16.

Disposed behind the blades 13 and 14 and slightly above the level thereof is a roller 24 which at its ends has short stub shafts 25 which are journaled in bearings 26 secured to the side plates 11 in proper positions.

Within each side plate 11 and over the respective blades 13 and 14 is arranged a cleaning disk 27 of thin circular form. These disks 27 are journaled in bearings 28 secured to the side plates and the disks barely clear the plates, as seen in Figures 3 and 5. The side plates 11 carry bracket strips 29 on outer sides to the ends of which the bearings 26 and 28 may be fastened.

In operation, as the machine moves forwardly along the potato rows, the blades 13 and 14 will dig out the vines and guide them toward the center so that the vines, attached clods of earth and the like will be delivered rearwardly toward the bar screen mechanism B whereon the material is shaken to dislodge the clods and drop all such matter back to the ground. The roller 24 fills in the space between the rear ends of the blades 13 and 14 and the forward end of the mechanism B, preventing the vines or potatoes from falling to the ground before delivery to the screen and permitting the use of blades shorter than would otherwise be required. The roller is, of course, rotated by the rearward movement of the material thereover.

The disks 27 are rotated by the material moving rearwardly over the blades and therefore serve to break up and forestall any accumulation of dirt and material at the junctions between the blades and the side plates 11. Such accumulation, if permitted, would block off a part of the screening area at each side reducing the effective capacity and otherwise interfering with effective functioning of the machine.

The inward movement of the crop material over the blades 13 and 14 due to their shape and inclination, aids greatly, as will be evident, in their effective scouring and polishing which in turn will contribute greatly to the efficiency of the blades.

Having now fully disclosed my invention, what I claim as new and desire to secure by Letters Patent is:

1. In a potato digger, a wheel borne frame, a pair of spaced and laterally disposed side plates secured to the frame, and digging blades disposed at inner sides of the side plates, the said side plates having lugs to support the outer edges of the blades, bolts adapted to be passed through the blades and the lugs, and washers disposed between the blades and the lugs for adjusting the blades in an up and down direction with respect to the side plates.

2. The combination with a potato digging implement, of a digging mechanism therefor comprising a pair of side members for attachment to the implement, digging blades secured to the side members, a roller journaled between the side members rearwardly of the blades, and disks journaled at inner side of the side members forwardly of the roller and above the said blades.

JOHN F. COYLE.